UNITED STATES PATENT OFFICE.

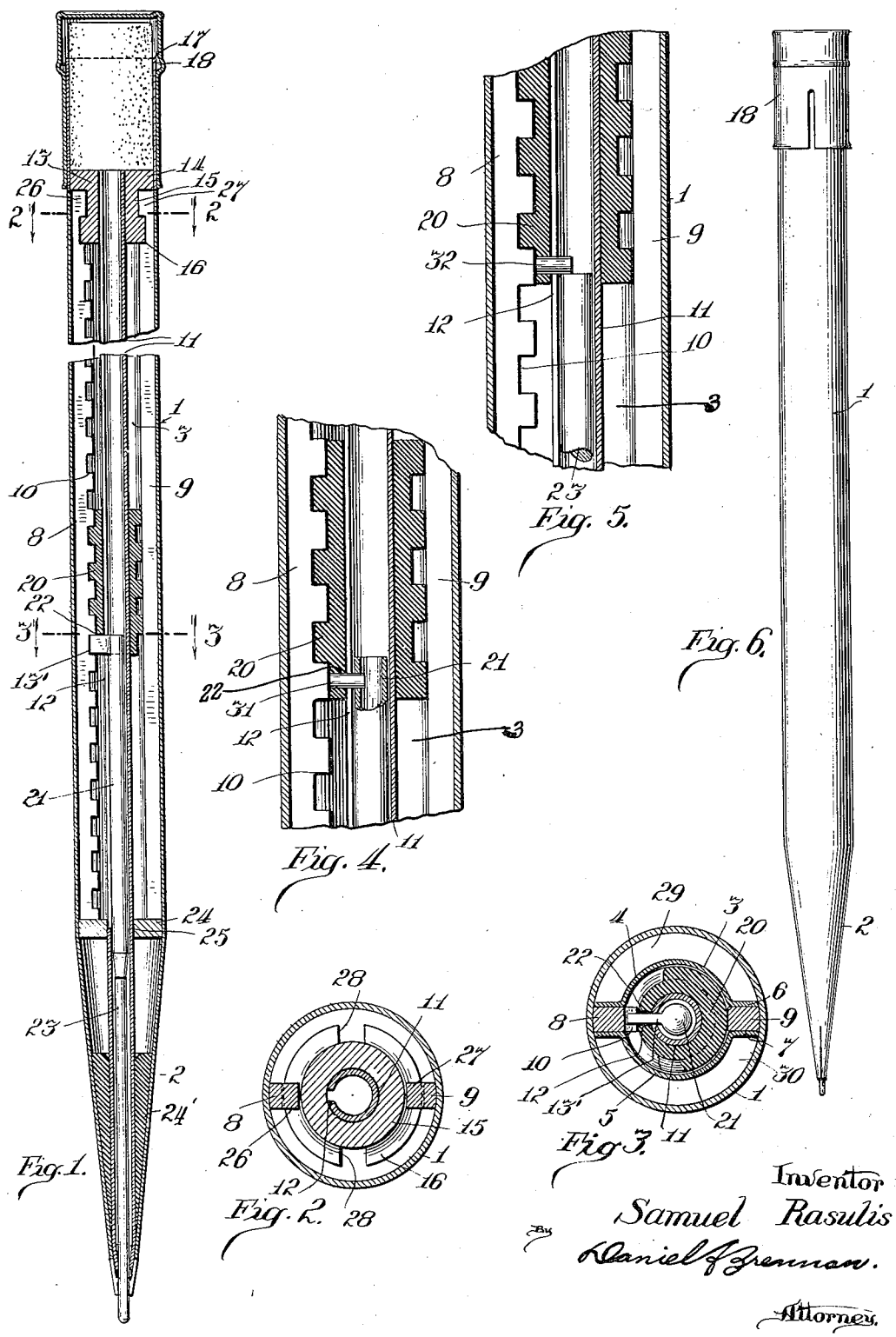

SAMUEL RASULIS, OF CHICAGO, ILLINOIS.

PENCIL.

1,409,406.

Specification of Letters Patent. Patented Mar. 14, 1922.

Application filed May 1, 1920. Serial No. 378,266.

*To all whom it may concern:*

Be it known that I, SAMUEL RASULIS, citizen of the Republic of Lithuania, residing at Chicago, county of Cook, and State of Illinois, have invented a new and useful Improvement in Pencils, of which the following is a specification.

The invention relates to pencils, and more particularly to refillable pencils, which comprise a pencil-holder and a lead adapted to be adjusted into operative position.

It is an object of the invention to provide a pencil of the character specified, which is of simple construction but eminently useful for the purpose assigned thereto.

It is a further object of the invention to provide a pencil-holder comprising a casing formed with a rack with which a plunger is in threaded engagement, so that upon adjustment of said plunger in one direction the lead is forced outwardly from the casing to assume its functional position.

It is a further object of the invention to provide simplified means for actuating said plunger.

A further object aims at the provision of a loose connection of the actuating means and the plunger so that said actuating means may be readily disconnected therefrom.

A still further object aims at the provision of the casing with compartments to receive a plurality of leads, constituting a supply from which a lead may be taken to replace a worn out one.

With these and other objects in view, which will become apparent upon perusal of the description of the invention, the latter comprises the construction and arrangements of parts described in the specification, particularly pointed out in the appended claims and illustrated in the accompanying drawing, in which:

Fig. 1 is a sectional view of the pencil constructed in accordance with my invention;

Fig. 2 is a cross-section on the line 2—2 of Fig. 1;

Fig. 3 is a cross-section on the line 3—3 of Fig. 1;

Fig. 4 is a fragmentary sectional view of an intermediate portion of the pencil with a modified form of plunger;

Fig. 5 is a view similar to Fig. 4, but slightly modified; and,

Fig. 6 is a view of the pencil.

Referring to the several figures of the drawing, 1 designates a tubular casing or shell which, for the greater portion of its length, is cylindrical and at its lower portion merges into a conical portion 2 constituting the point of the pencil. Interiorly of the casing 1 and spaced therefrom is an inner casing 3 concentrically arranged and formed of two sections, 4 and 5, which are provided at their ends with flanges 6 and 7, which abut against the outer casing 1 and maintain sections 4 and 5 in proper relation, with respect to the outer casing. As indicated particularly in Figure 3, the flanges 6 and 7 are spaced at a suitable distance from one another to receive therebetween spacing bars 8 and 9, which at the inner side are conterminous with the inner periphery of the sections 4 and 5. The spacing bar 8 is constructed at its inner side as a rack 10 for a purpose hereinafter further specified. The rack 10 extends beyond the inner periphery of the casing 3, but the spacing bar 9 is flush with the inner surface of the casing 3. In concentric relation to the casings 1 and 3, a tube 11 is arranged which approximately has the same length as the casing 1 and which is formed with a longitudinal slot 12 for a purpose presently to be explained. The tube 11 enters and is fixedly secured to a knob portion 13 at its upper end, which comprises a circular disk 14, a cylinder 15 of less diameter than the disk 14, and a cylindrical portion 16 of greater diameter than the part 15, but smaller than the disk 14.

The different parts of the knob are preferably, although not necessarily, formed integral. The disk 14 is surrounded by a short tube 17 having a tight fit therewith and constituting a holder for an eraser. The tube 17 is again surrounded by a cap 18 which forms a cover for the eraser and constitutes an ornate head for the pencil, whereby the latter has a pleasing appearance. The tube 11 is surrounded by an elongated worm 20, provided with exterior teeth adapted to engage the teeth of the rack 10. The tube 11 surrounds a plunger 21 loosely, which at its upper end is formed with a lateral finger 13', extending through the slot 12 of the tube 11 and also extending through and having detachable mounting in a slot 22 of the worm 20 so that the rotation of the plunger 21 is transmitted by the extension 13' to the worm 20. The plunger 21 bears on a lead 23 arranged within the tube 11 which is adapted to project beyond the tube 11 and the casing 1 so that the pencil may be used for writing. When the projecting portion of the lead is used up and it is desired to force a contiguous portion of the lead outwardly of the casing the cap 18 is rotated, which rotation is participated in by the tube 17, the knob 13 and the tube 11. The rotation of the tube 11 causes the plunger 21 to rotate and as the latter is coupled to the worm 20, the worm will also be rotated. Since the teeth of the worm engage the rack 10, the worm will be caused to execute a descending movement, provided the cap 18 and the associated parts are rotated in the proper direction and this downward or outward movement of the plunger 21 will displace the lead 23 so that an adjacent portion of the lead protrudes from the casing. At the place where the cylindrical portion of the casing 1 merges into the conical portion 2, a partition 24 is provided with a central aperture 25 for the passage of the tube 11, as is also centering member 24'. This centering member in shape preferably takes the same form as that of the conical portion 2, and may be constructed of some material suitable as a bearing for the tube 11. The spacing bars 8 and 9 formed at the upper end with enlarged portions 26 and 27 to enter the circular recess formed in the knob 13 between the disk 14 and the cylindrical portion 16.

As indicated in Fig. 2, the cylindrical portion 16 of the knob 13 is formed with two diametrically opposite slots 28 which may be brought into register with the enlarged portions or lugs 26 and 27 of the bars 8 and 9, whereupon the knob 13 and its associated parts may be quickly withdrawn; this being possible by reason of the slot 12, which permits sliding between the tube 11 and the finger 13' of the plunger 21. The provision of the inner casing 3 at a distance from the outer casing 1 results in the formation of compartments 29 and 30 as shown in Fig. 3, which constitute reservoirs for a number of leads which may be stored therein and may be removed therefrom whenever the lead 23 is used up and a new one is to be inserted into the holder. The possibility of quickly withdrawing the knob 13, tube 17, cap 18 and tube 11 from the casing 1 enables convenient and rapid access to the reservoirs 29 and 30 for the removal of a lead.

The connection between the plunger and the worm in engagement with the rack may be modified. As indicated in Fig. 4, a pin 31 extends through the slot 12 of the tube 11 and enters the worm 20 and the plunger 21.

The provision of a plunger for the purpose of adjusting the lead is not necessary and may be dispensed with. As shown in Fig. 5 of the drawing, the worm 20 is equipped with a pin 32 which is adapted to engage the lead 23. Upon rotation of the knob or the tube 11, the pin 32 arranged in the slot 12 not only serves to transmit the rotary movement of the tube 11 to the worm 20, but also acts as a pusher pin for ejecting the lead from the casing consistent with the downward movement of the worm 20.

The drawing discloses a preferred embodiment of the invention, but various changes and alterations may be made within the spirit of the invention. I, therefore, do not limit myself to the constructional features precisely, as shown, but wish to avail myself of any modifications constituting departures within the purview of the invention as defined in the appended claims.

I claim:

1. In a pencil, a casing formed with an opening through which a lead is introduced, a plunger arranged in said casing and adapted to bear on the lead, a longitudinal rack formed in said casing, and means detachably connected to said plunger and engaging said rack for longitudinally shifting said plunger.

2. In a pencil, a cylindrical casing formed with an opening at one end through which a lead is introduced and with inwardly extending lugs, a longitudinal rack formed in said casing, a plunger arranged in said casing and adapted to bear on the lead, a tube surrounding said plunger and provided with a head having a circular recess at the upper end to receive said casing lugs, said tube being provided with a longitudinal slot, and means connected to said plunger through said tube slot and engaging said rack for longitudinally shifting said plunger.

3. In a pencil, a cylindrical casing formed with an opening at one end through which a lead is introduced and with inwardly extending lugs, a longitudinal rack formed in said casing, a plunger arranged in said casing and adapted to bear on the lead, a tube surrounding said plunger, a knob at the upper end of said tube having a circular recess to receive said casing lugs, said tube being provided with a longitudinal slot, an exteriorly threaded worm in engagement with said rack and means extending through said tube slot for connecting said worm and plunger.

4. In a pencil, a casing formed at one end with an opening through which a lead is introduced and with inwardly extending lugs, a longitudinal rack formed in said casing, a plunger arranged in said casing and adapted to bear on the lead, a tube surrounding said plunger, a knob at the upper end of said tube having a circular recess to receive said casing lugs, said knob having diametrically opposite longitudinal slots opening into said recess and adapted to be placed in registry with said lugs for removal of said knob and tube, said tube being provided with a longitudinal slot, an exteriorly threaded worm in engagement with said rack, and means extending through said tube slot to connect said plunger and said worm.

5. In a pencil, a casing formed at one end with an opening through which a lead is introduced, and with inwardly extending lugs, compartments in said casing for the reception of leads, a longitudinal rack formed in said casing, a plunger arranged in said casing and adapted to bear on the lead, a tube surrounding said plunger, a knob at the upper end of said tube closing said compartments and having a circular recess to receive said casing lugs, said knob having diametrically opposite longitudinal slots opening into said recess and adapted to be placed in registry with said lugs for removal of said knob and tube, said tube being provided with a longitudinal slot, an exteriorly threaded worm in engagement with said rack and a pin extending through said slot to connect said plunger and said worm.

6. In a pencil, a main casing, an inner concentric casing composed of two arcuate sections formed with longitudinal spacing flanges to space said inner and main casings and provide chambers, spacing bars between said flanges and secured to the main casing, a concentric tube in said inner casing for receiving a writing lead and provided with an open end, and means operating in said tube for ejecting a pencil lead therefrom.

7. In a pencil, a main casing, an inner concentric casing composed of two arcuate sections formed with longitudinal spacing flanges to space said inner and main casings and provide chambers, spacing bars between said flanges and secured to the main casing, one of said bars having a rack portion, a concentric tube in said inner casing and provided with an open end, and means operating in said tube in engagement with said rack for ejecting the pencil lead from said tube.

8. In a pencil, a main casing, an inner concentric casing composed of two arcuate sections formed with longitudinal spacing flanges to space said inner and main casings and provide chambers, spacing bars between said flanges and secured to the main casing, one of said bars having a rack portion, a concentric tube in said inner casing and provided with an open end, said tube having a longitudinal slot therein, and means operating in said tube in engagement with the rack through said slot for ejecting the pencil lead from said tube.

In testimony whereof I affix my signature in the presence of two witnesses.

SAMUEL RASULIS.

Witnesses:
MICHAEL M. KAUFMANN,
ERNEST D. SUMMERS.